United States Patent [19]
Butterfield et al.

[11] Patent Number: 5,361,735
[45] Date of Patent: * Nov. 8, 1994

[54] BELT DRIVEN VARIABLE CAMSHAFT TIMING SYSTEM

[75] Inventors: Roger P. Butterfield, Interlaken; Stanley K. Dembosky, Ithaca; Franklin R. Smith, Slaterville Springs, all of N.Y.

[73] Assignee: Borg-Warner Automotive Transmission & Engine Components Corporation, Sterling Heights, Mich.

[*] Notice: The portion of the term of this patent subsequent to Mar. 26, 2008 has been disclaimed.

[21] Appl. No.: 870,437

[22] Filed: Apr. 16, 1992

Related U.S. Application Data

[63] Continuation-in-part of Ser. No. 713,465, Jun. 11, 1991, Pat. No. 5,107,804, which is a continuation-in-part of Ser. No. 584,913, Sep. 19, 1990, Pat. No. 5,046,460, which is a continuation-in-part of Ser. No. 422,353, Oct. 16, 1989, Pat. No. 5,002,023.

[51] Int. Cl.5 .................................. F01L 1/34
[52] U.S. Cl. ............................. 123/90.17; 123/90.31; 464/2
[58] Field of Search ............... 123/90.15, 90.17, 90.31; 464/1, 2, 160

[56] References Cited

U.S. PATENT DOCUMENTS

| | | | |
|---|---|---|---|
| 4,498,431 | 2/1985 | Nakamura et al. | 123/90.17 |
| 4,895,113 | 1/1990 | Speier et al. | 123/90.17 |
| 5,002,023 | 3/1991 | Butterfield et al. | 123/90.15 |
| 5,012,773 | 5/1991 | Akasaka et al. | 123/90.31 |
| 5,046,460 | 9/1991 | Butterfield et al. | 123/90.15 |
| 5,056,477 | 10/1991 | Linder et al. | 123/90.17 |
| 5,056,478 | 10/1991 | Ma | 123/90.17 |
| 5,088,456 | 2/1992 | Suga | 123/90.31 |
| 5,107,804 | 4/1992 | Becker et al. | 123/90.17 |
| 5,121,717 | 6/1992 | Simko et al. | 123/90.17 |

FOREIGN PATENT DOCUMENTS

| | | |
|---|---|---|
| 0388244 | 9/1990 | European Pat. Off. |
| 0422791 | 4/1991 | European Pat. Off. |
| 3619956 | 12/1987 | Germany |
| 10469 | 11/1989 | WIPO |

*Primary Examiner*—E. Rollins Cross
*Assistant Examiner*—Weilun Lo
*Attorney, Agent, or Firm*—William, Brinks, Hofer

[57] ABSTRACT

A camshaft (326) has a vane (360) secured to an end thereof for a non-oscillating rotation therewith. The camshaft also carries a timing belt driven pulley (332) which can rotate with the camshaft but which is oscillatable with respect to the camshaft. The vane has opposed lobes (360a, 360b) which are received in opposed recesses (332a, 332b), respectively, of the pulley. The recesses have greater circumferential extent than the lobes to permit the vane and sprocket to oscillate with respect to one another and thereby permit the camshaft to change in phase relative to a crankshaft whose phase relative to the sprocket is fixed by virtue of the timing belt (338) drive extending therebetween. The camshaft tends to change in reaction to torque pulses which it experiences during its normal operation and it is permitted to advance or retard by selectively blocking or permitting the flow of engine oil from the recesses by controlling the position of a spool (400) within a valve body (392) of a control valve in response to a signal from an engine control unit (408). The spool is urged in a given direction by rotary linear motion translating means (682) which is rotated by an electric motor (686), preferably of the stepper motor type.

19 Claims, 12 Drawing Sheets

BELT DRIVEN VARIABLE CAMSHAFT TIMING SYSTEM

CROSS-REFERENCE TO RELATED APPLICATIONS

This application is a continuation-in-part of copending application Ser. No. 713,465, filed Jun. 11, 1991, now U.S. Pat. No. 5,107,804, which, in turn, is a continuation-in-part of co-pending application Ser. No. 584,913, filed Sep. 19, 1990, now U.S. Pat. No. 5,046,460, the disclosure of which is incorporated by reference herein. The aforesaid co-pending application Ser. No. 584,913, in turn, was a continuation-in-part of application Ser. No. 422,353, filed Oct. 16, 1989, which was co-pending therewith, now U.S. Pat. No. 5,002,023, the disclosure of which is also incorporated by reference herein.

FIELD OF THE INVENTION

This invention relates to a belt driven variable camshaft timing (VCT) system for an automotive engine, the VCT system being of the type in which the position of the camshaft is circumferentially varied relative to the position of a crankshaft in reaction to torque reversals experienced by the camshaft during its normal operation. The VCT system of this invention includes a system which operates with a dry or unlubricated timing belt to transmit torque from a crankshaft to one or more camshafts, whereas its chain driven counterparts utilize a timing chain which is advantageously continuously lubricated by the engine lubricating oil.

BACKGROUND OF THE INVENTION

The aforesaid U.S. Pat. No. 5,002,023 specifically illustrates and describes a hydraulically operated VCT system in which the operating hydraulic fluid is engine lubricating oil and in which the camshaft(s) is (are) driven by a timing chain which is continuously lubricated by the engine lubricating oil to ensure proper operation of the chain and its associated components. However, many engine types utilize cogged timing belts in transmitting torque from a crankshaft to the camshaft(s) of a single camshaft or multiple camshaft engine, and such belt driven systems are usually operated in a dry or unlubricated condition. Thus, to adapt a VCT system of the aforesaid U.S. Pat. No. 5,002,023 to a timing belt driven engine, it is desirable that appropriate seals be utilized to prevent engine lubricating oil from contacting the belt(s) and the associated pulleys and other components which regularly contact the belt(s) during the operation of the engine.

Further, the use of the hydraulically operated control system of the aforesaid Ser. No. 713,465 to control the positioning of a spool in the hydraulic circuitry of the VCT actuating vane pump and related hydraulic circuitry would introduce substantial complexity into the design of the control system and the environment around it to suitably seal the control system and thereby ensure the proper, dry operation of the timing belt(s) and associated components. In the present invention, this can be accomplished by using a linearly acting electric motor, such as a stepper motor, to position the spool of the VCT control system spool valve.

SUMMARY OF THE INVENTION

The present invention provides a belt driven VCT system which relies on hydraulic forces in the phase adjustment of the camshaft(s) of an automotive engine relative to the crankshaft, but which incorporates suitable seals around the belt(s) and associated components to ensure the dry operation thereof, notwithstanding their proximity to hydraulically operated devices.

The present invention also provides an improved method and apparatus for controlling the position of a spool in an hydraulic control valve. Specifically, the present invention provides a non-hydraulic method and apparatus for controlling the position of a spool in a hydraulic control valve in a VCT system, for example, an hydraulic control valve which is used in an oppositely-acting hydraulic cylinder VCT timing system of the type disclosed in U.S. Pat. No. 5,002,023, or an hydraulic control valve which is used in a vane-type VCT timing system of the type disclosed in U.S. Ser. No. 713,465.

The position of the spool in the control valve of the VCT system of the present invention is adjusted by a linearly acting electric motor, such as a stepper motor, and this eliminates the presence of hydraulic fluid at an end of the control valve which could otherwise be a source of undesirable leakage of engine oil or other hydraulic fluid into the belt driven system.

Accordingly, it is an object of the present invention to provide a method and apparatus for varying the positional orientation or phase of one or more camshaft(s) in relation to a crankshaft of an internal combustion engine, in which the crankshaft to camshaft drive elements are protected from exposure to engine oil or other hydraulic fluid which is flowing in proximity to one or more of such drive elements.

It is also an object of the present invention to provide a variable camshaft timing system in which the position of a linearly acting control valve member for the system is subject to change in a non-hydraulic manner, for example, in response to the operation of a linearly acting electric motor.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 1:
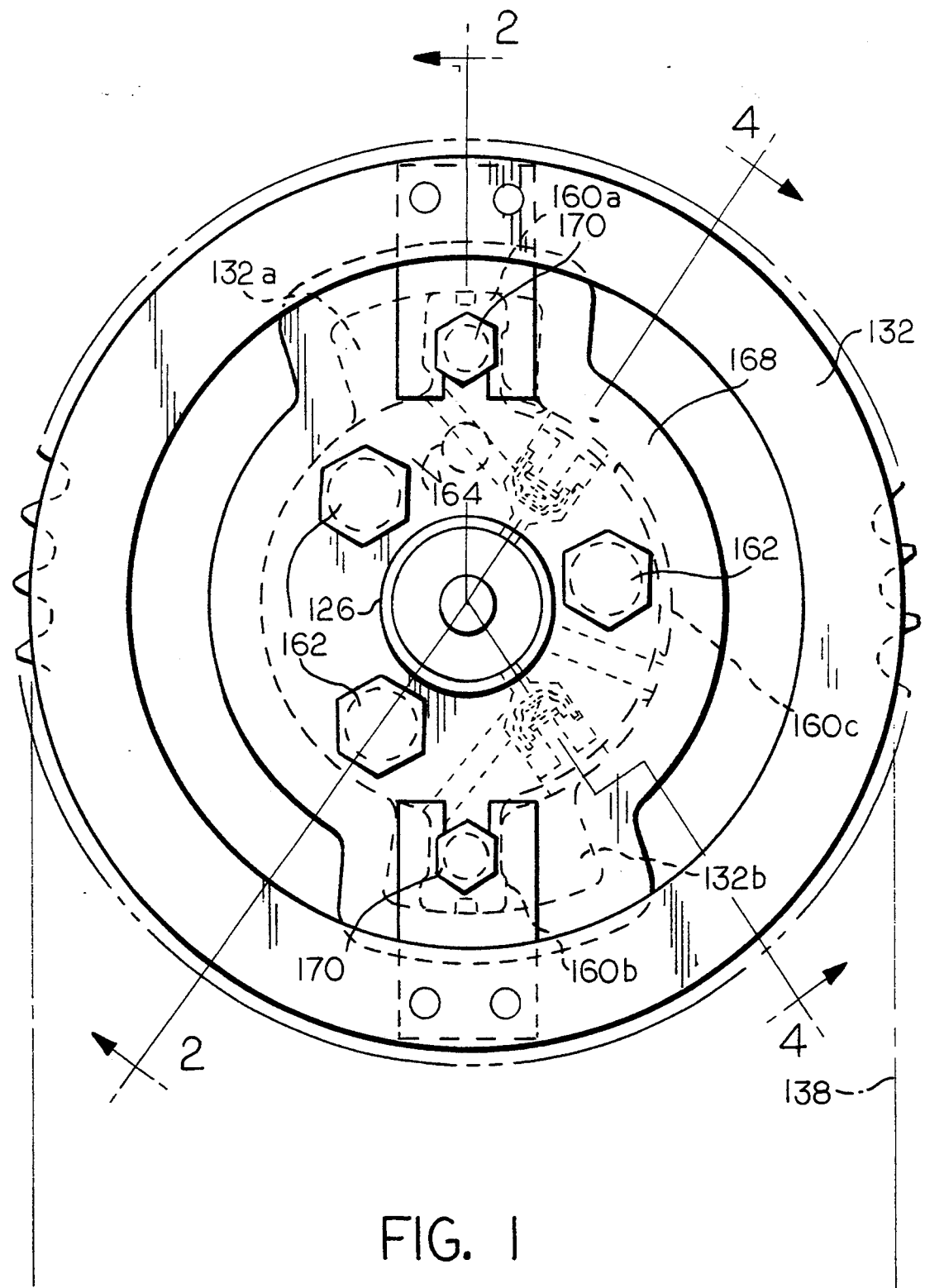
FIG. 1 is an end elevational view of a camshaft with an embodiment of a variable camshaft timing system applied thereto.

FIGS. 1–10 illustrate an embodiment of the present invention in which a housing in the form of a sprocket 132 is oscillatingly journalled on a camshaft 126. The camshaft 126 may be considered to be the only camshaft of a single camshaft engine, either of the overhead camshaft type or the in block camshaft type. Alternatively, the camshaft 126 may be considered to be either the intake valve operating camshaft or the exhaust valve operating camshaft of a dual camshaft engine. In any case, the sprocket 132 and the camshaft 126 are rotatable together, and are caused to rotate by the application of torque to the sprocket 132 by an endless roller chain 138, shown fragmentarily, which is trained around the sprocket 132 and also around a crankshaft, not shown. As will be hereinafter described in greater detail, the sprocket 132 is oscillatingly journalled on the camshaft 126 so that it is oscillatable at least through a limited arc with respect to the camshaft 126 during the rotation of the camshaft, an action which will adjust the phase of the camshaft 126 relative to the crankshaft.

An annular pumping vane 160 is fixedly positioned on the camshaft 126, the vane 160 having a diametrically opposed pair of radially outwardly projecting lobes 160a, 160b and being attached to an enlarged end portion 126a of the camshaft 126 by bolts 162 which pass through the vane 160 into the end portion 126a. In that regard, the camshaft 126 is also provided with a thrust shoulder 126b to permit the camshaft to be accurately positioned relative to an associated engine block, not shown. The pumping vane 160 is also precisely positioned relative to the end portion 126a by a dowel pin 164 which extends therebetween. The lobes 160a, 160b are received in radially outwardly projecting recesses 132a, 132b, respectively, of the sprocket 132, the circumferential extent of each of the recesses 132a, 132b being somewhat greater than the circumferential extent of the vane lobe 160a, 160b which is received in such recess to permit limited oscillating movement of the sprocket 132 relative to the vane 160. The recesses 132a, 132b are closed around the lobes 160a, 160b, respectively, by spaced apart, transversely extending annular plates 166, 168 which are fixed relative to the vane 160, and, thus, relative to the camshaft 126, by bolts 170 which extend from one to the other through the same lobe, 160a, 160b. Further the inside diameter 132c of the sprocket 132 is sealed with respect to the outside diameter of the portion 160d of the vane 160 which is between the lobes 160a, 160b, and the tips of the lobes 160a, 160b of the vane 160 are provided with seal receiving slots 160e, 160f, respectively. Thus each of the recesses 132a, 132b of the sprocket 132 is capable of sustaining hydraulic pressure, and within each recess 132a, 132b, the portion on each side of the lobe 160a, 160b, respectively, is capable of sustaining hydraulic pressure.

Figure 10:
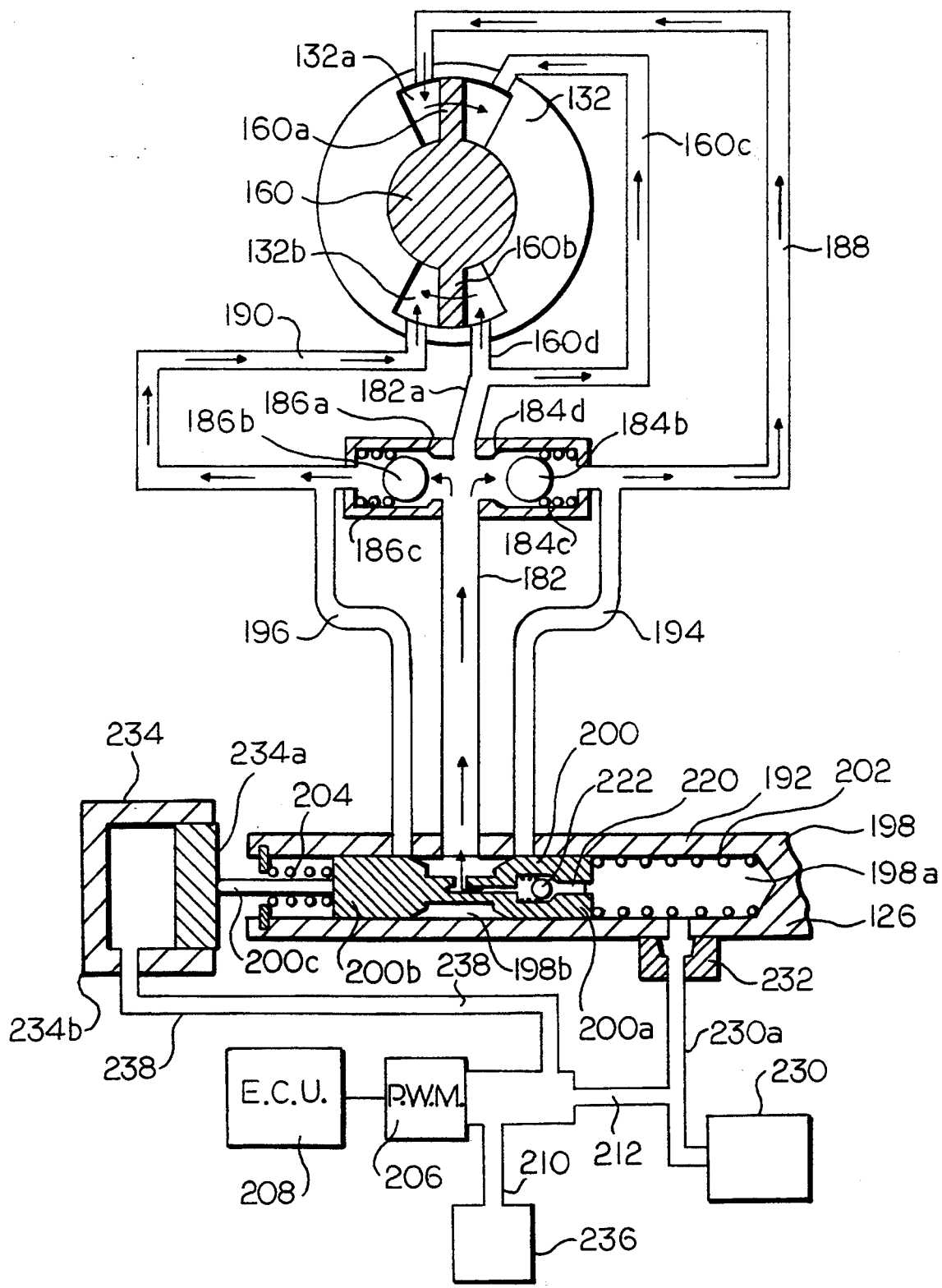
FIG. 10 is a simplified schematic view of the variable camshaft timing arrangement of FIGS. 1-9.

The functioning of the structure of the embodiment of FIGS. 1–9, as thus far described, may be understood by reference to FIG. 10. Hydraulic fluid, illustratively in the form of engine lubricating oil, flows into the recesses 132a, 132b by way of a common inlet line 182. The inlet line 182 terminates at a juncture between opposed check valves 184 and 186 which are connected to the recesses 132a, 132b, respectively, by branch lines 188, 190, respectively. The check valves 184, 186 have annular seats 184a, 186a, respectively, to permit the flow of hydraulic fluid through the check valves 184, 186 into the recesses 132a, 132b, respectively. The flow of hydraulic fluid through the check valves 184, 186 is blocked by floating balls 184b, 186b, respectively, which are resiliently urged against the seats 184a, 186a, respectively, by springs 184c, 186c, respectively. The check valves 184, 186, thus, permit the initial filling of the recesses 132a, 132b and provide for a continuous supply of make-up hydraulic fluid to compensate for leakage therefrom. Hydraulic fluid enters the line 182 by way of a spool valve 192, which is incorporated within the camshaft 126, and hydraulic fluid is returned to the spool valve 192 from the recesses 132a, 132b by return lines 194, 196, respectively.

The spool valve 192 is made up of a cylindrical member 198 and a spool 200 which is slidable to and fro within the member 198. The spool 200 has cylindrical lands 200a and 200b on opposed ends thereof, and the lands 200a and 200b, which fit snugly within the member 198, are positioned so that the land 200b will block the exit of hydraulic fluid from the return line 196, or the land 200a will block the exit of hydraulic fluid from the return line 194, or the lands 200a and 200b will block the exit of hydraulic fluid from both the return lines 194 and 196, as is shown in FIG. 10, where the camshaft 126 is being maintained in a selected intermediate position relative to the crankshaft of the associated engine.

The position of the spool 200 within the member 198 is influenced by an opposed pair of springs 202, 204 which act on the ends of the lands 200a, 200b, respectively. Thus, the spring 202 resiliently urges the spool 200 to the left, in the orientation illustrated in FIG. 10, and the spring 204 resiliently urges the spool 200 to the right in such orientation. The position of the spool 200 within the member 198 is further influenced by a supply of pressurized hydraulic fluid within a portion 198a of the member 198, on the outside of the land 200a, which urges the spool 200 to the left. The portion 198a of the member 198 receives its pressurized fluid (engine oil) directly from the main oil gallery ("MOG") 230 of the engine by way of a conduit 230a, and this oil is also used to lubricate a bearing 232 in which the camshaft 126 of the engine rotates.

The control of the position of the spool 200 within the member 198 is in response to hydraulic pressure within a control pressure cylinder 234 whose piston 234a bears against an extension 200c of the spool 200. The surface area of the piston 234a is greater than the surface area of the end of the spool 200 which is exposed to hydraulic pressure within the portion 298, and is preferably twice as great. Thus, the hydraulic pressures which act in opposite directions on the spool 200 will be in balance when the pressure within the cylinder 234 is one-half that of the pressure within the portion 198a, assuming that the surface area of the piston 234a is twice that of the end of the land 200a of the spool. This facilitates the control of the position of the spool 200 in that, if the springs 202 and 204 are balanced, the spool 200 will remain in its null or centered position, as illustrated in FIG. 10, with less than full engine oil pressure in the cylinder 234, thus allowing the spool 200 to be moved in either direction by increasing or decreasing the pressure in the cylinder 234, as the case may be. Further, the operation of the springs 202, 204 will ensure the return of the spool 200 to its null or centered position when the hydraulic loads on the ends of the lands 200a, 200b come into balance.

Figure 2:
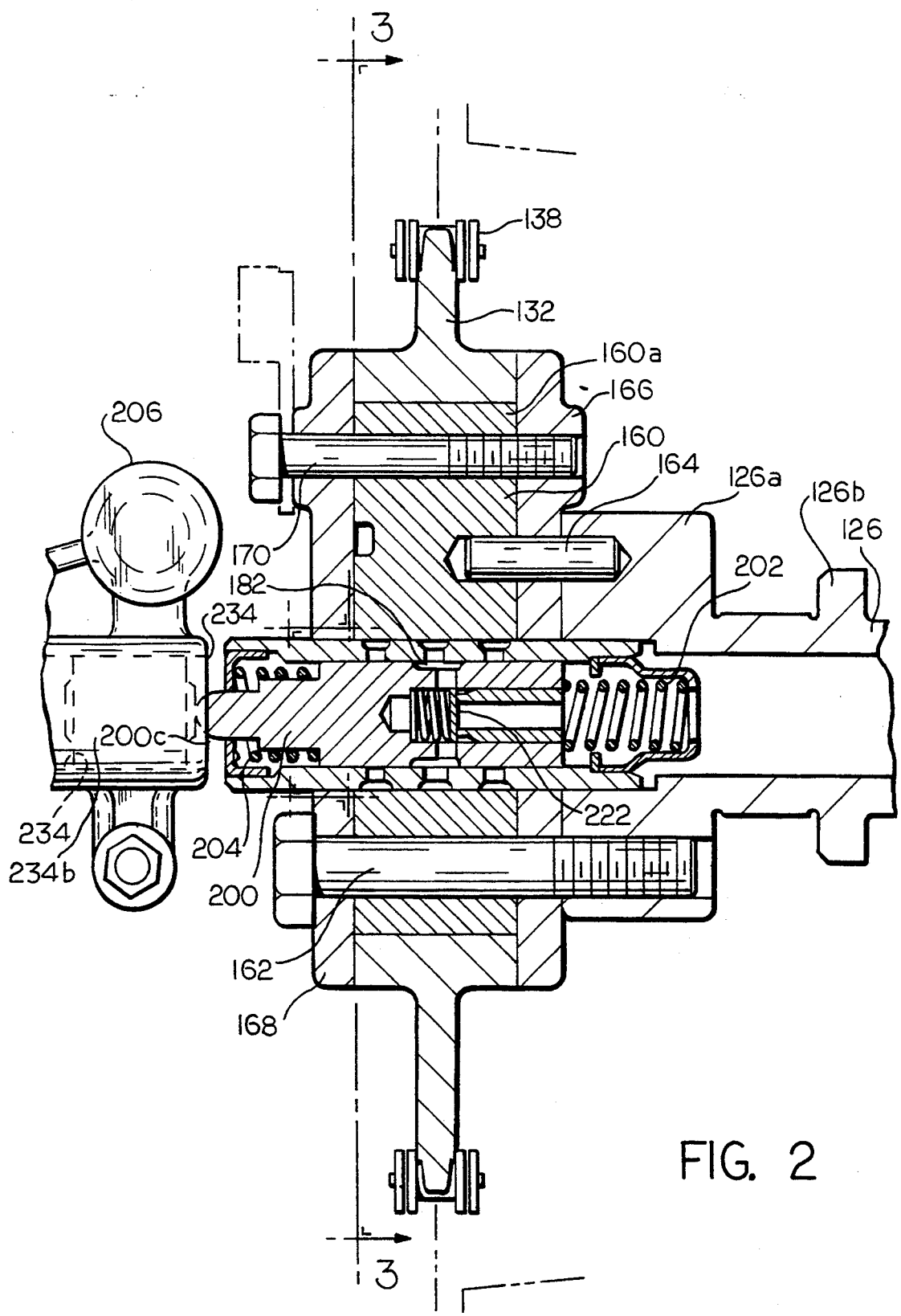
FIG. 2 is a sectional view taken on line 2—2 of FIG. 1.
Figure 3:
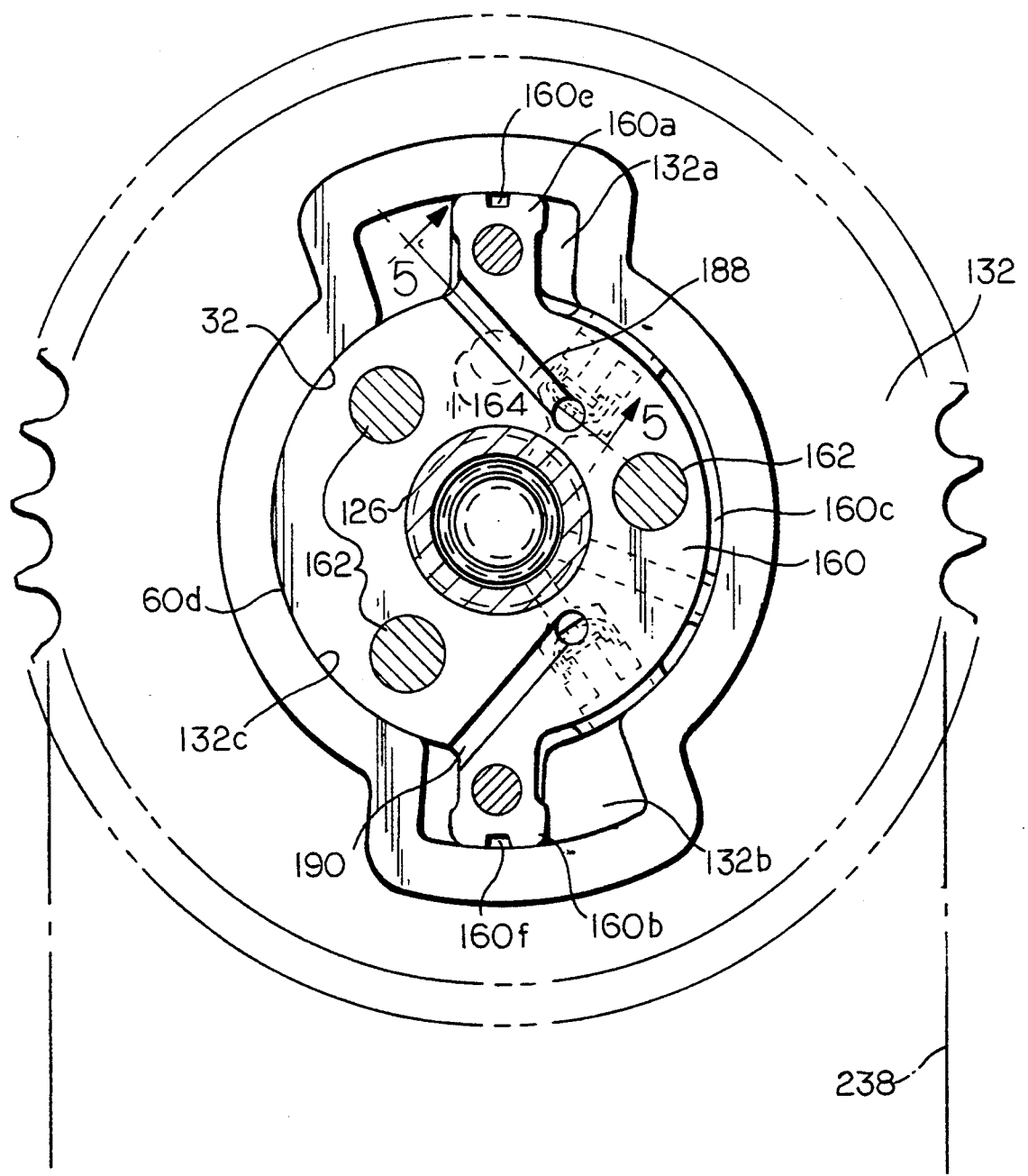
FIG. 3 is a view similar to FIG. 1 with a portion of the structure thereof removed to more clearly illustrate other portions thereof.
Figure 4:
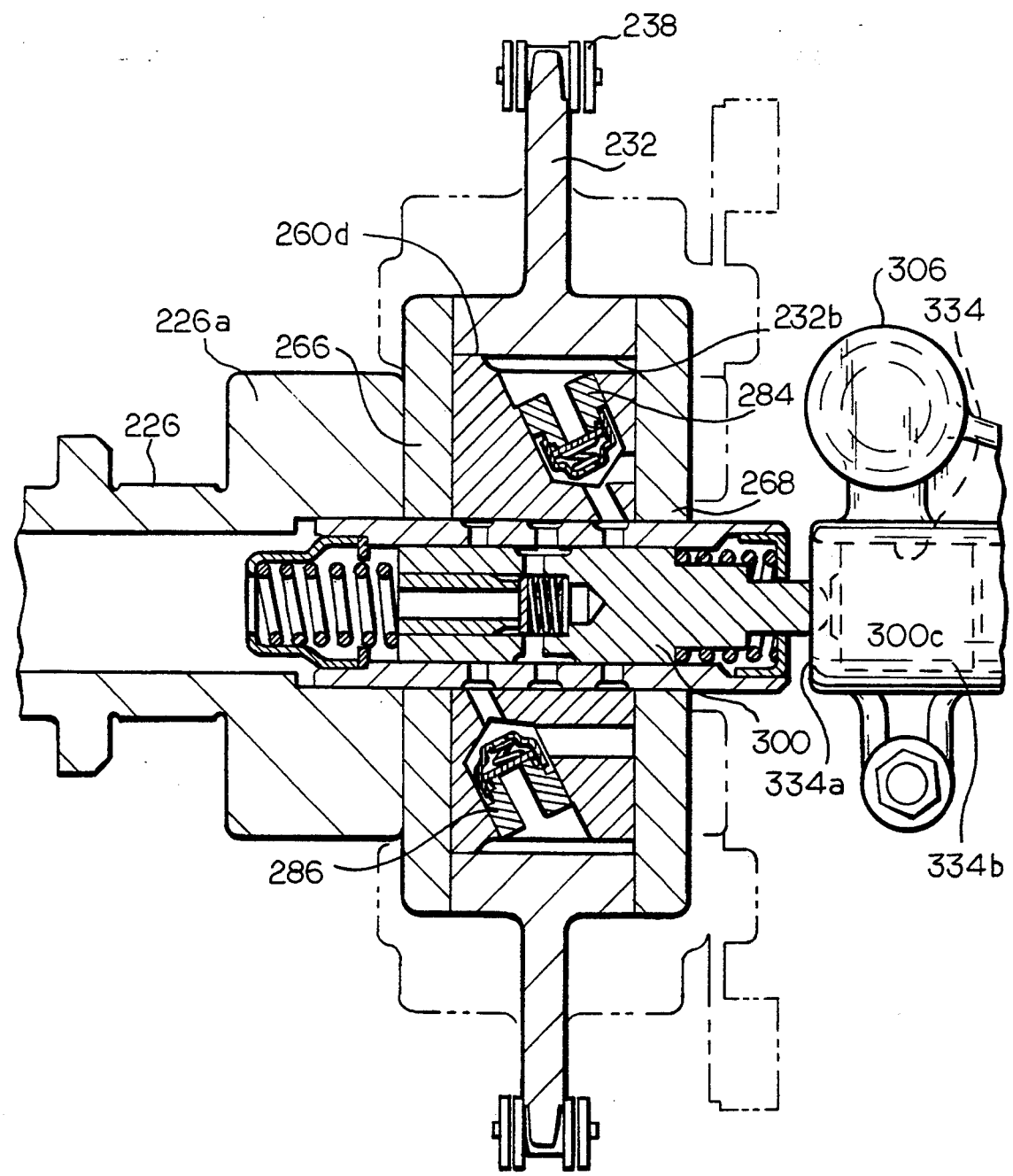
FIG. 4 is a sectional view taken on line 4—4 of FIG. 1.
Figures 6, 7:
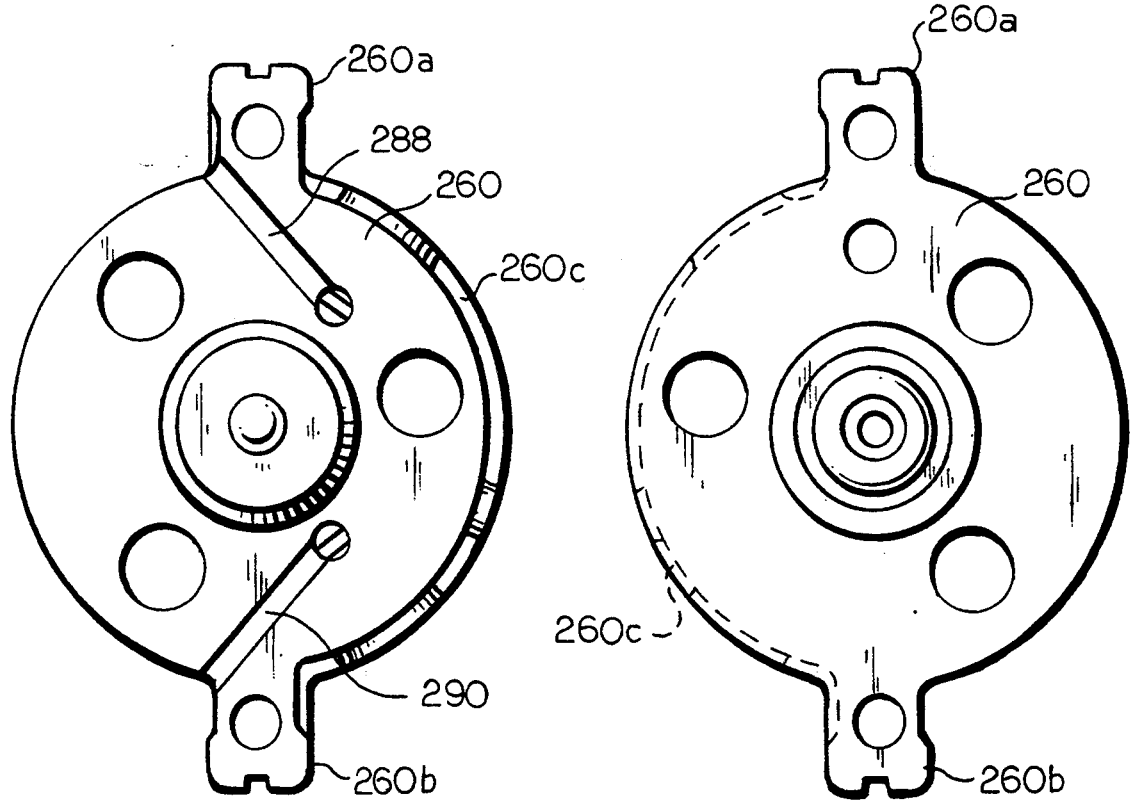
FIG. 6 is an end elevational view of an element of the variable camshaft timing system of FIGS. 1-5.
FIG. 7 is an elevational view of the element of FIG. 6 from the opposite end thereof.
Figure 5:
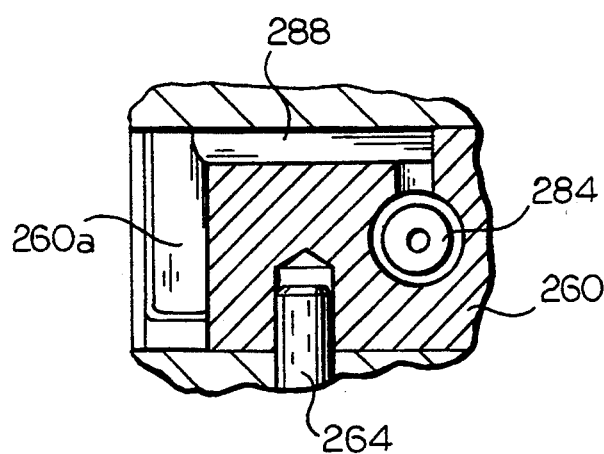
FIG. 5 is a sectional view taken on line 5—5 of FIG. 3.
Figure 8:
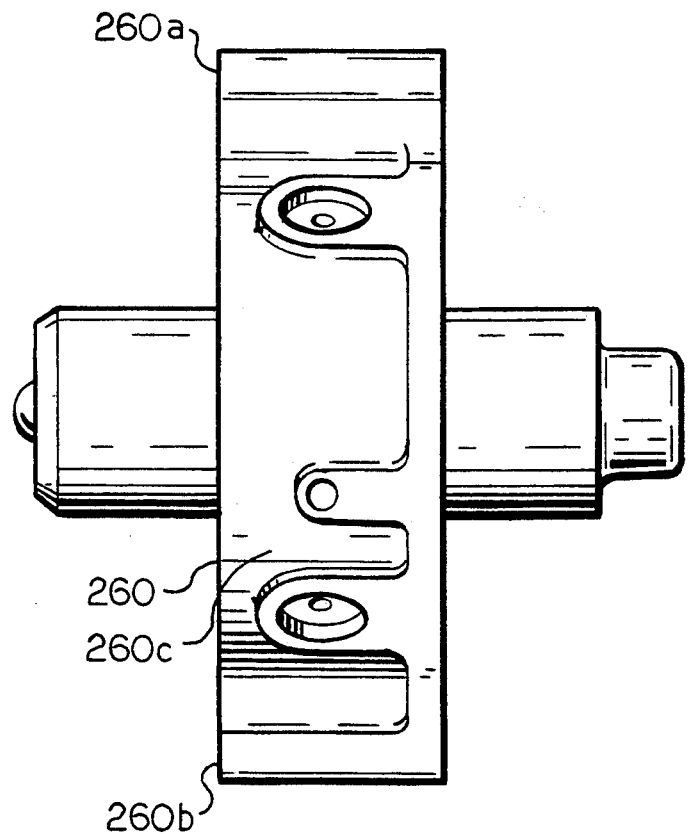
FIG. 8 is a side elevational view of the element of FIGS. 6 and 7.
Figure 9:
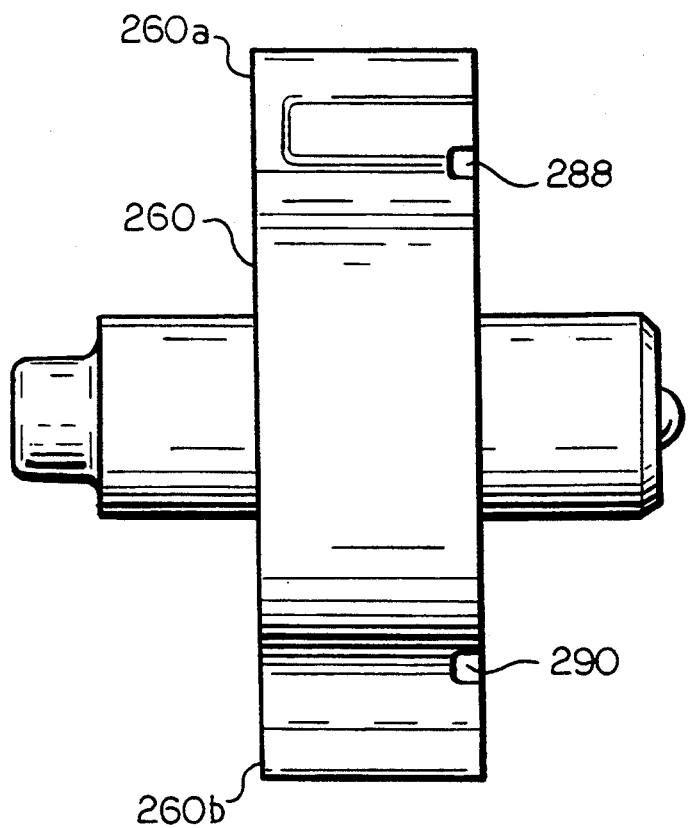
FIG. 9 is an elevational view of the element of FIG. 8 from the opposite side thereof.

The pressure within the cylinder 234 is controlled by a solenoid 206, preferably of the pulse width modulated type (PWM), in response to a control signal from an electronic engine control unit (ECU) 208, shown schematically, which may be of conventional construction. With the spool 200 in its null position when the pressure in the cylinder 234 is equal to one-half the pressure in the portion 198a, as heretofore described, the on-off pulses of the solenoid 206 will be of equal duration; by increasing or decreasing the on duration relative to the off duration, the pressure in the cylinder 234 will be increased or decreased relative to such one-half level, thereby moving the spool 200 to the right or to the left, respectively. The solenoid 206 receives engine oil from the engine oil gallery 230 through an inlet line 212 and selectively delivers engine oil from such source to the cylinder 234 through a supply line 238. Excess oil from the solenoid 206 is returned to a sump 236 through line 210. As is shown in FIGS. 2, 4 and 10, the cylinder 234 may be mounted at an exposed end of the camshaft 126 so that the piston 234a bears against an exposed free end 200c of the spool 200. In this case, as is shown in FIGS. 2 and 4, the solenoid 206 is preferably mounted in a housing 234b which also houses the cylinder 234a.

By using imbalances between oppositely acting hydraulic loads from a common hydraulic source on the opposed ends of the spool 200 to move it in one direction or another, as opposed to using imbalances between a hydraulic load on one end and a mechanical load on an opposed end, the control system of FIG. 10 is capable of operating independently of variations in the pressure of the hydraulic system. Thus, it is not necessary to vary the duty cycle of the solenoid 206 to maintain the spool 200 in any given position, for example, in its centered or null position, as the pressure of the hydraulic fluid changes during the operation of the system. In that regard, it is to be understood that the centered or null position of the spool 200 is the position where no change in camshaft to crankshaft phase angle is occurring, and it is important to be able to rapidly and reliably position the spool 200 in its null position for proper operation of a VCT system.

Make up oil for the recesses 132a, 132b of the sprocket 132 to compensate for leakage therefrom is provided by way of a small, internal passage 220 within the spool 200, from the passage 198a to an annular space 198b of the cylindrical member 198, from which it can flow into the inlet line 182. A check valve 222 is positioned within the passage 220 to block the flow of oil from the annular space 198b to the portion 198a of the cylindrical member 198.

The vane 160 is alternatingly urged in clockwise and counterclockwise directions by the torque pulsations in the camshaft 126, as explained in the aforesaid U.S. Pat. Nos. 5,046,460 and 5,002,023, and these torque pulsations tend to oscillate the vane 160, and, thus, the camshaft 126, relative to the sprocket 132. However, in the FIG. 10 position of the spool 200 within the cylindrical member 198, such oscillation is prevented by the hydraulic fluid within the recesses 132a, 132b of the sprocket 132 on opposite sides of the lobes 160a, 160b, respectively, of the vane 160, because no hydraulic fluid can leave either of the recesses 132a, 132b, since both return lines 194, 196 are blocked by the position of the spool 200, in the FIG. 10 condition of the system. If, for example, it is desired to permit the camshaft 126 and vane 160 to move in a counterclockwise direction with respect to the sprocket 132, it is only necessary to increase the pressure within the cylinder 234 to a level greater than one-half that in the portion 198a of the cylindrical member. This will urge the spool 200 to the right and thereby unblock the return line 194. In this condition of the apparatus, counterclockwise torque pulsations in the camshaft 126 will pump fluid out of the portion of the recess 132a and allow the lobe 160a of vane 160 to move into the portion of the recess which has been emptied of hydraulic fluid. However, reverse movement of the vane will not occur as the torque pulsations in the camshaft become oppositely directed unless and until the spool 200 moves to the left, because of the blockage of fluid flow through the return line 196 by the land 200b of the spool 200.

While illustrated as a separate closed passage in FIG. 10, the periphery of the vane 160 has an open oil passage slot, element 160c in FIGS. 1, 3, 6 and 8, which permits the transfer of oil between the portion of the recess 132a on the right side of the lobe 160a and the portion of the recess 132b on the right side of the lobe 160b, which are the non-active sides of the lobes 160a, 160b; thus, counterclockwise movement of the vane 160 relative to the sprocket 132 will occur when flow is permitted through return line 194 and clockwise movement will occur when flow is permitted through return line 196.

Further, the passage 182 is provided with an extension 182a to the non-active side of one of the lobes 160a, 160b, shown as the lobe 160b, to permit a continuous supply of make-up oil to the non-active sides of the lobes 160a, 160b for better rotational balance, improved damping of vane motion, and improved lubrication of the bearing surfaces of the vane 160. It is to be noted that the supply of make-up oil in this manner avoids the need to route the make-up oil through the solenoid 206. Thus, the flow of make-up oil does not affect, and is not affected by the operation of the solenoid 206. Specifically, make-up oil will continue to be provided to the lobes 160a, 160b in the event of failure of the solenoid 206, and it reduces the oil flow rates that need to be handled by the solenoid 206.

The elements of the structure of FIGS. 1–9 which correspond to the elements of FIG. 10, as described above, are identified in FIGS. 1–9 by the reference numerals which were used in FIG. 10, it being noted that the check valves 184 and 186 are disc-type check valves in FIGS. 1–9 as opposed to the ball type check valves of FIG. 10. While disc-type check valves are preferred for the embodiment of FIGS. 1–9, it is to be understood that other types of check valves can also be used.

Figure 11:
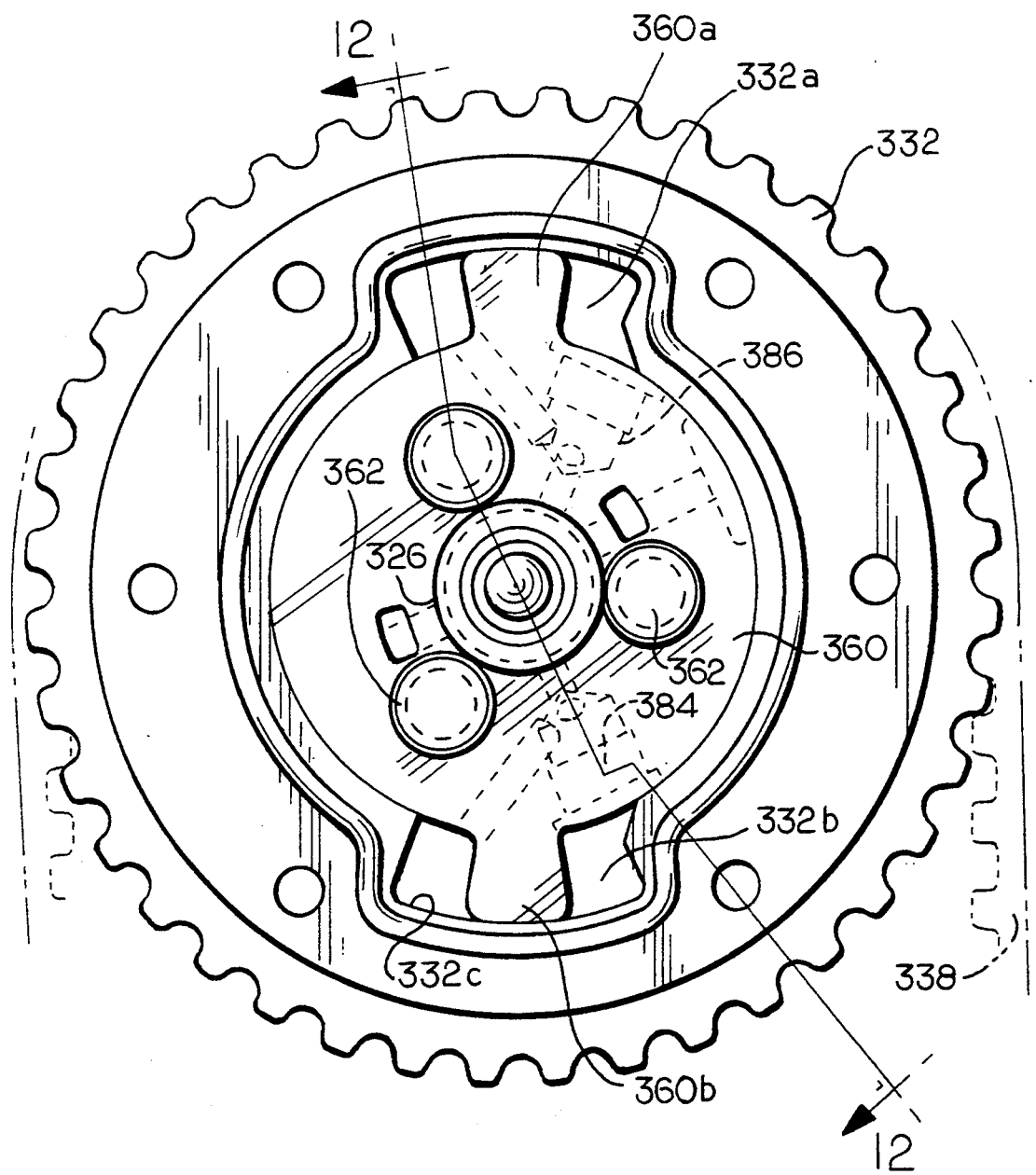
FIG. 11 is a view similar to FIG. 1 of a belt driven variable camshaft timing system according to the present invention.
Figure 12:
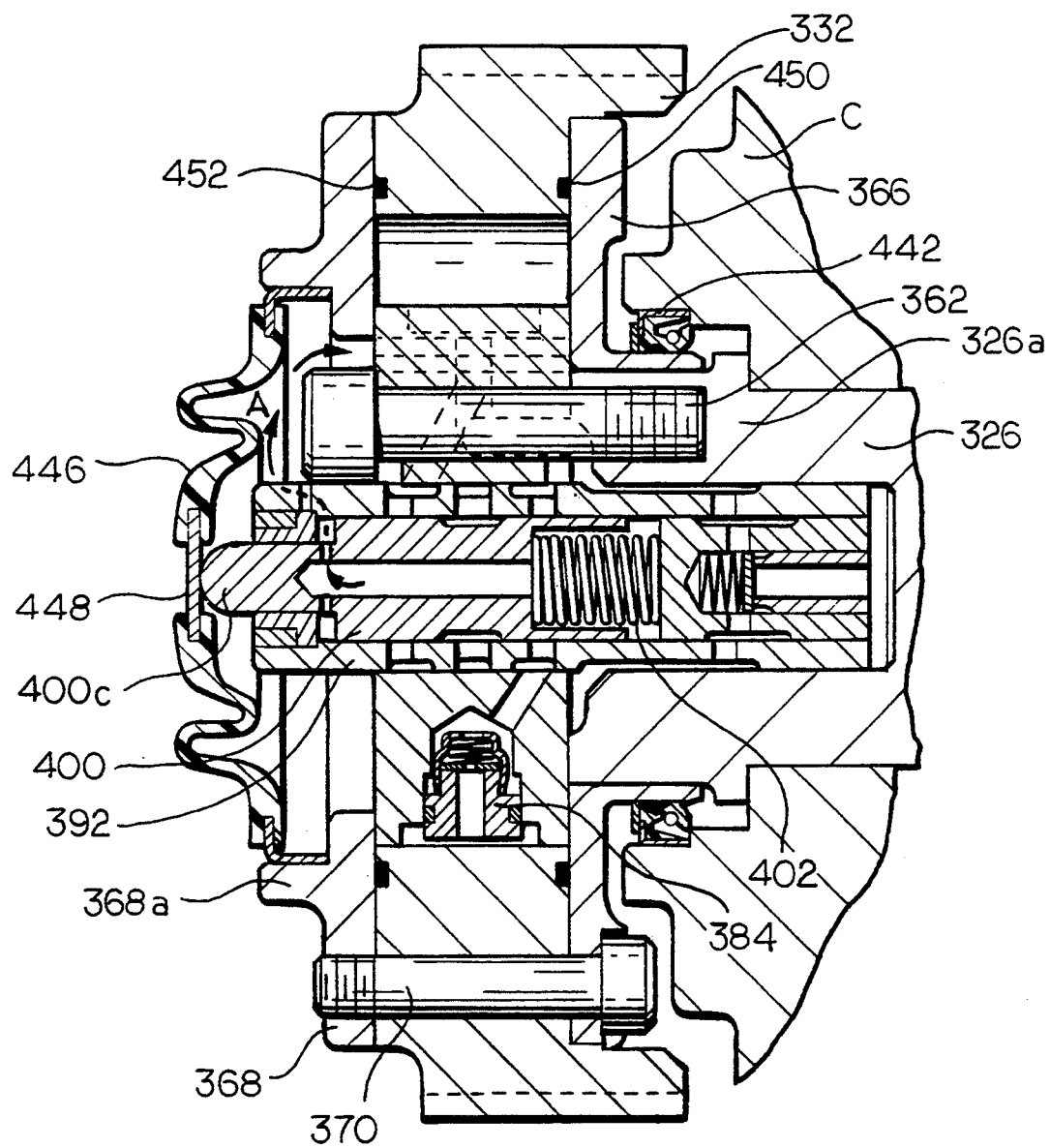
FIG. 12 is a view taken on line 12—12 of FIG. 11.

FIGS. 11 and 12 illustrate an embodiment of the present invention which, like the embodiment of FIGS. 1–10, utilizes an engine oil operated, hydraulic vane pump to change the circumferential position, or phase angle, of a camshaft relative to a crankshaft in an internal combustion engine. However, the embodiment of FIGS. 11 and 12 is suitable for use in an engine which utilizes a cogged timing belt to transmit torque from the crankshaft of the associated engine, not shown, to the camshaft, as opposed to a roller chain 138 in the embodiment of FIGS. 1-10, as some vehicle and engine manufacturers have a preference for belt driven camshafts over chain driven camshafts. In any case, the elements of the embodiment of FIGS. 11 and 12 which correspond in function to the elements of the embodiment of FIGS. 1-10 are identified by a three-digit numeral, the first digit of which is two integers higher than the first digit of the numeral for the corresponding element of the embodiment of FIGS. 1-10, and the last two digits of which are the same as the last two digits of the numeral for the corresponding element of FIGS. 1-10.

Thus, in the embodiment of FIGS. 11 and 12, there is provided a housing in the form of a pulley 332 for a cogged timing belt, the pulley 332 being oscillatingly journalled on a camshaft 326. The pulley 332 and the camshaft 326 are rotatable together, and are caused to rotate by the application of torque to the pulley 332 by an endless cogged timing belt 338, shown fragmentarily, which is trained around the pulley 332 and also around a crankshaft, not shown. As will be hereinafter described in greater detail, the pulley 332 is oscillatingly journalled on the camshaft 326 so that it is oscillatable at least through a limited arc with respect to the camshaft 326 during the rotation of the camshaft 326, an action which will adjust the phase of the camshaft 326 relative to the crankshaft.

An annular pumping vane 360 is fixedly positioned on the camshaft 326, the vane 360 having a diametrically opposed pair of radially outwardly projecting lobes 360a, 360b and being attached to an enlarged end portion 326a of the camshaft 326 by bolts 362 which pass through the vane 360 into the end portion 326a. The lobes 360a, 360b are received in radially outwardly projecting recesses 332a, 332b, respectively, of the pulley 332, the circumferential extent of each of the recesses 332a, 332b being somewhat greater than the circumferential extent of the vane lobe 360a, 360b which is received in such recess to permit limited oscillating movement of the pulley 332 relative to the vane 360. The recesses 332a, 332b are closed around the lobes 360a, 360b, respectively, by spaced apart, transversely extending annular plates 366, 368 which are fixed relative to the pulley 332 by bolts 370 which extend from one of the plates 366, 368 to the other through the pulley 332. Further, the tips of the lobes 360a, 360b are sealed against an inside diameter 332c of the recesses 332a, 332b of the pulley 332 by seal means, not shown. Thus, each of the recesses 332a, 332b of the pulley 332 is capable of sustaining hydraulic pressure, and within each recess 332a, 332b, the portion on each side of the lobe 360a, 360b, respectively, is capable of sustaining hydraulic pressure.

As in the case of the embodiment of FIGS. 1-10, hydraulic fluid, illustratively in the form of engine lubricating oil, flows into the recesses 332a, 332b by way of a common inlet line, not shown. The inlet line terminates at a juncture between opposed check valves 384, 386. The hydraulic fluid enters the inlet line by way of a spool valve 392 which is positioned within an end of the camshaft 326. The spool valve 392 is provided with a spool 400 which is slidable to and fro with respect to and along the longitudinal axis of the camshaft 326 to thereby controllably permit hydraulic fluid to be exhausted from one or another of the recesses 332a, 332b in reaction to the direction of torque pulsations in the camshaft 326, which will vary during the normal rotation thereof as is explained in the aforesaid U.S. Pat. Nos. 5,002,023 and 5,046,460. In turn, the controlled exhaustion of hydraulic fluid from one or another of the recesses 332a, 332b will result in a controlled changing of the phase angle of the camshaft 326 relative to the pulley 332, and thus, relative to the associated crankshaft.

To prevent the hydraulic fluid which is within the recesses 332a, 332b and within the associated lines leading thereto and therefrom from contacting the portion of the pulley 332 which engages the timing belt 338, an annular seal 442 is provided between the annular plate 366 and the cylinder head or engine block C to permit the pulley 332 and the plate 366 to sealingly oscillate relative to the cylinder head or engine block C, and also relative to the camshaft 326. In that regard, annular seals 450, 452 are positioned between the plate 366 and the pulley 332, and between the plate 368 and the pulley 332, respectively. Further, an outermost end 400c of the spool 400, an end which is acted on by a longitudinally acting control system operator as will be hereinafter described more fully, is enclosed within an annular flexible diaphragm 446, the annulus of which sealingly engages a rigid disc element 448. The disc element 448, in turn, is longitudinally aligned with the spool 400 and is positioned to act against the end 400c thereof against the effect of a spring 402 which acts on the other end thereof. The periphery 446a of the diaphragm 446, in turn, is sealingly affixed to the inside of a longitudinally extending annular shoulder 368a of the annular cover plate 368. All of the return oil flow from the camshaft 326 occurs within the flexible diaphragm 446, as is indicated by the arrow A in FIG. 12.

Figure 13:
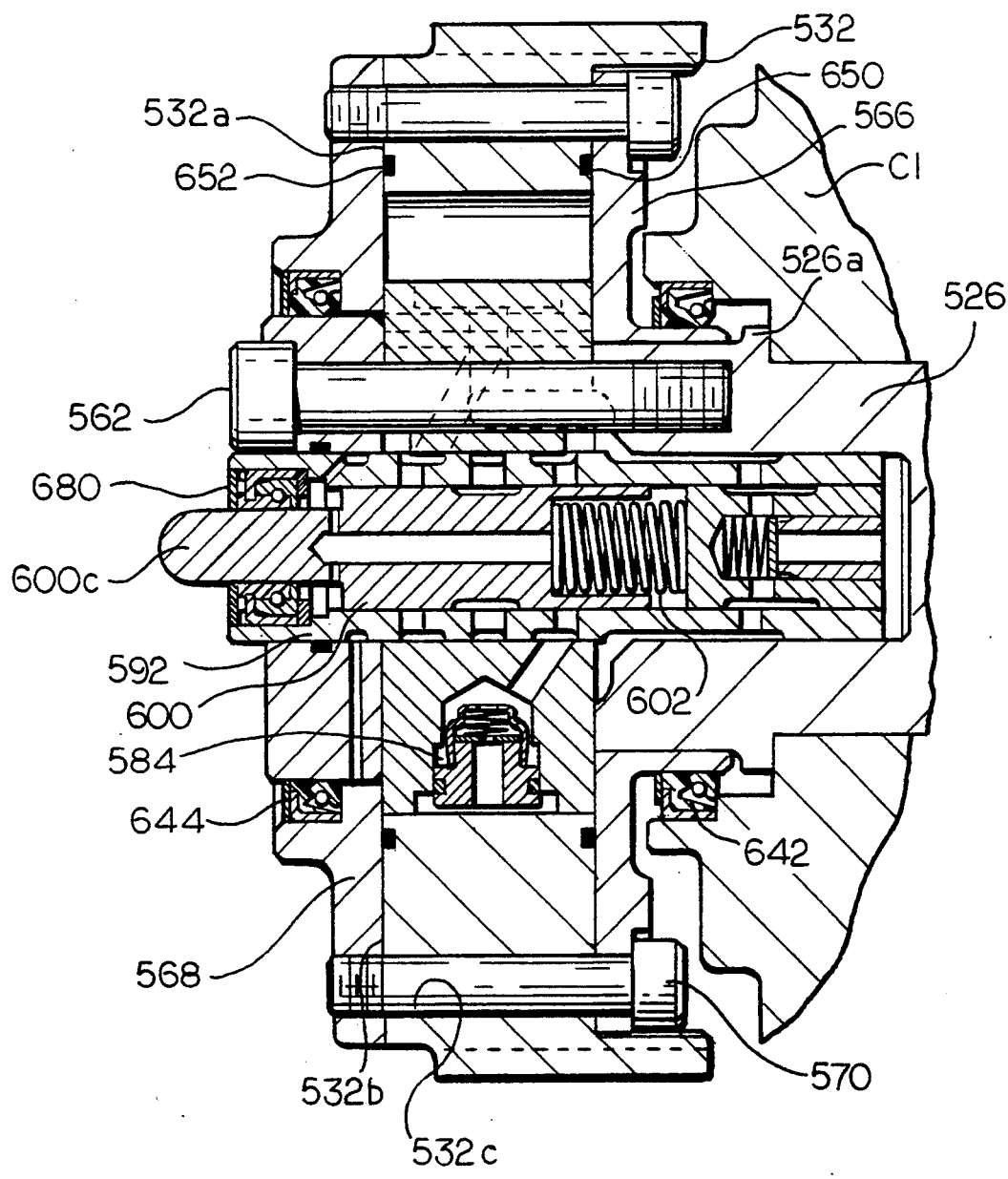
FIG. 13 is a view similar to FIG. 12 of an alternative embodiment of the present invention.

In the embodiment of FIG. 13, the elements which correspond in function to the elements of the embodiment of FIGS. 11 and 12 are identified by a three digit numeral, the first digit of which is two integers higher than the first digit of the numeral for the corresponding element of FIGS. 11 and 12, and the last two digits of which are the same as the last two digits of the numeral for the corresponding element of FIGS. 11 and 12.

Thus, in the embodiment of FIG. 13, there is provided a housing in the form of a pulley 532 for a cogged timing belt, the pulley 532 being oscillatingly journalled on a camshaft 526. The pulley 532 and the camshaft 526 are rotatable together, and are caused to rotate by the application of torque to the pulley 532 by an endless cogged timing belt, not shown, which is trained around the pulley 532 and also around a crankshaft, also not shown. As will be hereinafter described in greater detail, the pulley 532 is oscillatingly journalled on the camshaft 526 so that it is oscillatable at least through a limited arc with respect to the camshaft 526 during the rotation of the camshaft 526, an action which will adjust the phase of the camshaft 526 relative to the crankshaft.

An annular pumping vane 560 is fixedly positioned on the camshaft 526, the vane 560 having a diametrically opposed pair of radially outwardly projecting lobes 560a, 560b and being attached to an enlarged end portion 526a of the camshaft 526 by bolts 562 which pass through the vane 560 into the end portion 526a. The lobes 560a, 560b are received in radially outwardly projecting recesses 532a, 532b, respectively, of the pulley 532, the circumferential extent of each of the recesses 532a, 532b being somewhat greater than the circumferential extent of the vane lobe 560a, 560b which is received in such recess to permit limited oscillating movement of the pulley 532 relative to the vane 560. The recesses 532a, 532b are closed around the lobes 560a, 560b, respectively, by spaced apart, transversely extending annular plates 566, 568 which are fixed relative to the pulley 532 by bolts 570 which extend from one of the plates 566, 568 to the other through the pulley 532. Further, the tips of the lobes 560a, 560b are sealed against an inside diameter 532c of the recesses 532a, 532b of the pulley 532 by seal means, not shown. Thus, each of the recesses 532a, 532b of the pulley 532 is capable of sustaining hydraulic pressure, and within each recess 532a, 532b, the portion on each side of the lobe 560a, 560b, respectively, is capable of sustaining hydraulic pressure.

As in the case of the embodiment of FIGS. 11 and 12, hydraulic fluid, illustratively in the form of engine lubricating oil, flows into the recesses 532a, 532b by way of a common inlet line, not shown. The inlet line terminates at a juncture between opposed check valves, only one of which, the check valve 584, is shown in FIG. 13. The hydraulic fluid enters the inlet line by way of a spool valve 592 which is positioned within an end of the camshaft 526. The spool value 592 is provided with a spool 600 which is slidable to and fro with respect to and along the longitudinal axis of the camshaft 526 to thereby controllably permit hydraulic fluid to be exhausted from one or another of the recesses 532a, 532b in reaction to the direction of torque pulsations in the camshaft 526, which will vary during the normal rotation thereof as is explained in the aforesaid U.S. Pat. Nos. 5,002,023 and 5,046,460. In turn, the controlled exhaustion of hydraulic fluid from one or another of the recesses 532a, 532b will result in a controlled changing of the phase angle of the camshaft 526 relative to the associated crankshaft.

To prevent the hydraulic fluid which is within the recesses 532a. 532b and within the associated lines leading thereto and therefrom from contacting the portion of the pulley 532 which engages the timing belt 538, a longitudinally spaced apart pair of annular seals 642, 644 is provided between the pulley 532 and the annular plates 566, 568, respectively, to permit the pulley 532 and the plates 566, 568 to sealingly oscillate relative to the camshaft 526 and the cylinder head or engine block C1. In that regard, annular seals 650,652 are positioned between the plate 566 and the pulley 532, and between the plate 568 and the pulley 532, respectively. Further, an outermost end 600c of the spool 600, an end which is acted on by a longitudinally acting control system as will be hereinafter described more fully, is positioned to be directly contacted by such a control system operator. To prevent the flow of hydraulic fluid from within the camshaft 526 to the control system operator an annular seal 680 is provided between the end 600c of the spool 600 and the portion of the camshaft 526 which surrounds the end 600c.

Figure 14:
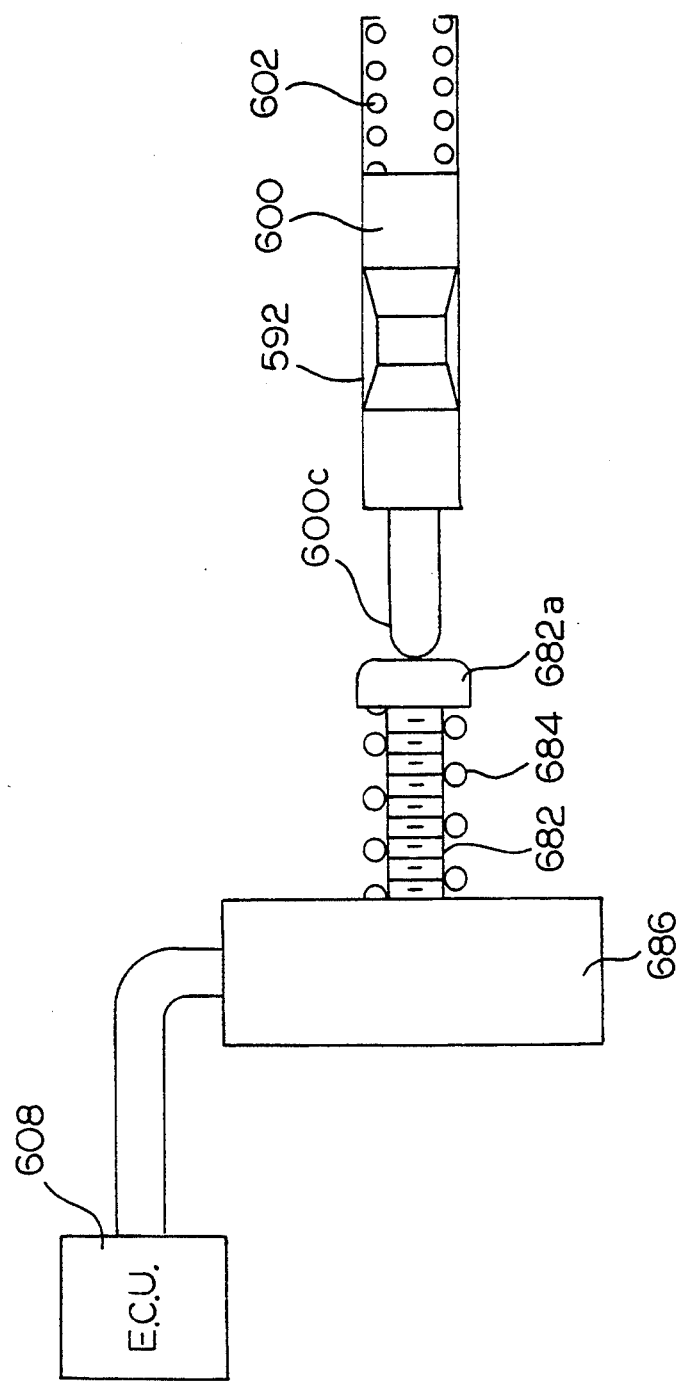
FIG. 14 is a schematic view of a control system operator for either the embodiment of FIGS. 11 and 12 or the embodiment of FIG. 13.
Figure 16:
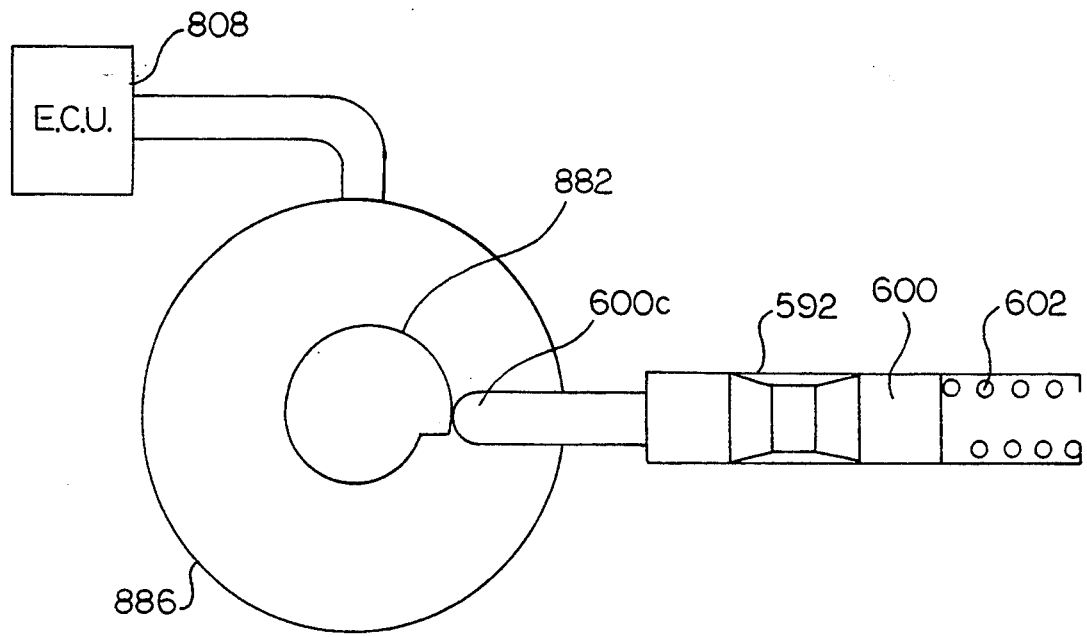
FIG. 16 is a schematic view similar to FIGS. 14 and 15 of another alternative embodiment of a control system operator for either the embodiment of FIGS. 11 and 12 or the embodiment of FIG. 13.
Figure 15:
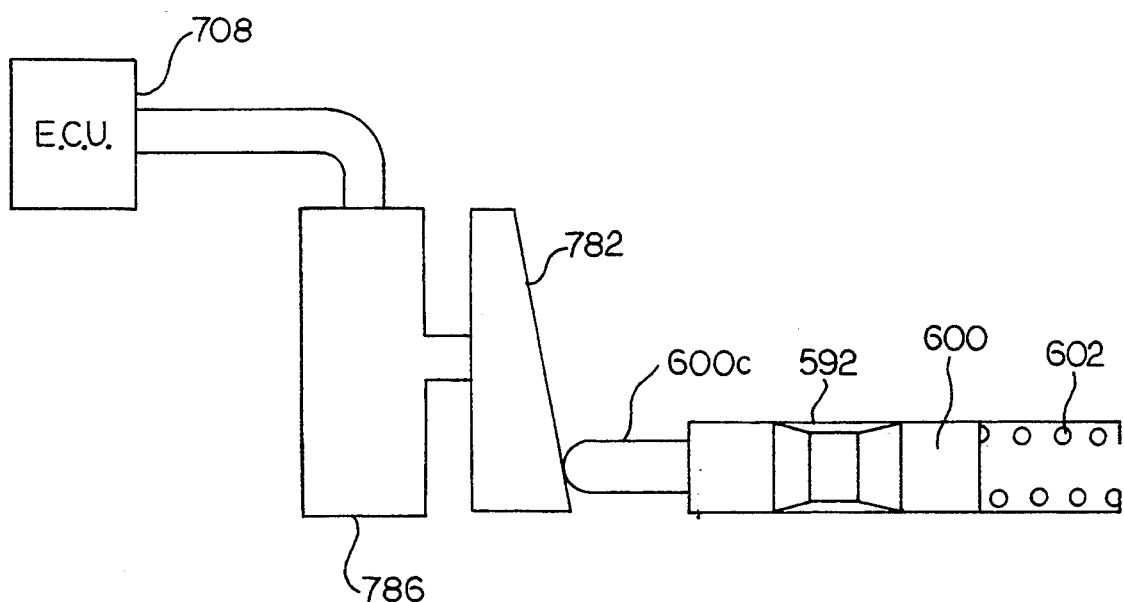
FIG. 15 is a schematic view similar to FIG. 14 of an alternative embodiment of a control system operator for either the embodiment of FIGS. 11 and 12 or the embodiment of FIG. 13.

The control system operators which are schematically illustrated in FIGS. 14–16 are specifically illustrated in conjunction with the embodiment of the variable camshaft timing system invention which is illustrated in FIG. 13, but it is to be understood that the control system operators of FIGS. 14–16 can also be used in conjunction with other embodiments of the variable camshaft timing system of the present invention, including, but not limited to, that of FIGS. 11 and 12. Specifically, the spool 600 is caused to move longitudinally within the spool valve 592 to the right in the illustrated arrangement, against the biasing return force of the return spring 602. In the embodiment of FIG. 14, the movement of the spool 600 is actuated by the head portion 682a of a lead screw 682 which is longitudinally aligned with the spool 600. The lead screw 682, which is urged to its fully advanced position by a spring 684, is caused to linearly extend or retract, as the case may be, by the rotary motion of a drive shaft of an electrical motor 686. The motor 686 is illustrated schematically and is preferably in the form of a stepper motor for precise control over the number and magnitude of the increments of extend and retract movements of the spool 600. The operation of the motor 686, in turn, is controlled by an engine control unit (ECU) 608, which corresponds in construction and function to the engine control unit 208 of FIG. 10. The spring 684 can be eliminated by directly connecting the lead screw 682 to the spool 660. However, this is not preferred since the spool 600 is biased against the lead screw 682 by the spring 602, and the spring 684 serves to offset the force on the lead screw 682 as a result of the action of the spring 602.

In the embodiment of FIG. 15 the rotary to linear motion translation function of the motor 686 and the lead screw 682 of FIG. 14 is performed by an axial face cam 782 which is caused to rotate in small increments by the operation of a stepper or other electrical motor 786. The axis of rotation of a drive shaft the motor 786 is aligned with the longitudinal axis of the spool 600 and the operation of the motor 786 is also controlled by an engine control unit (ECU) 708, which is analogous in construction and function to the engine control unit 608 of the embodiment of FIG. 14.

In the embodiment of FIG. 16, the rotary to linear motion translation function of the motor 686 and the lead screw 682 of FIG. 14, and of the motor 786 and axial face cam 782 of FIG. 15, is performed by a rotary cam 882 which is caused to rotate in small increments by the operation of a stepper or other electrical motor 886. The axis of rotation of a drive shaft of the motor 886 extends perpendicularly to the longitudinal axis of the spool 600, and the operation of the motor 886 is also controlled by an engine control unit (ECU) 808, which is analogous in construction and function to the engine control unit 608 of the embodiment of FIG. 14 and to the engine control unit 708 of the embodiment of FIG. 15.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A method of varying a relative phase position between a rotatable camshaft and a rotatable crankshaft in an internal combustion engine having a rotatable camshaft and a rotatable crankshaft, the camshaft being position variable relative to the crankshaft and being subject to torque reversals during the operation thereof, the method comprising:

providing oppositely acting first and second hydraulic means for varying the position of the camshaft relative to the crankshaft;

providing timing belt means for transmitting rotational movement from the crankshaft to the camshaft;

varying the position of the camshaft relative to the crankshaft by transferring hydraulic fluid from one of the first and second hydraulic means to the other of the first and second hydraulic means; and actuating the means for varying the position of the camshaft relative to the crankshaft in reaction to torque reversals in the camshaft.

2. The method according to claim 1 wherein the oppositely acting first and second hydraulic means comprise first and second circumferentially spaced apart lobes of a vane, the vane being attached to the camshaft, wherein the second members of the first and second hydraulic means comprise first and second circumferentially spaced apart recesses of a housing in the form of a pulley adapted to be driven by the timing belt means, each of the first and second recesses of the housing receiving one of the first and second lobes and permitting oscillating movement of one of the first and second lobes therein.

3. The method according to claim 2 wherein the means for varying the position of the housing relative to the camshaft comprises means for permitting the position of the housing to move in a first direction relative to the camshaft in reaction to a torque pulse in the camshaft in a first direction, means for preventing the position of the housing from moving relative to the camshaft in a second direction in reaction to a torque pulse in the camshaft in a second direction, and means for selectively reversing the first and second directions of the movement of the housing relative to the camshaft with respect to the first and second directions of torque pulses in the camshaft.

4. The method according to claim 3 wherein each of the recesses is capable of sustaining hydraulic pressure, wherein each of the lobes divides the recess in which it is received into a first portion and a second portion, and wherein the varying of the position of the housing relative to the camshaft comprises:

transferring hydraulic fluid into one of the first portion and the second portion of each of the recesses.

5. The method according to claim 4 wherein the varying of the position of the housing relative to the camshaft further comprises;

simultaneously transferring hydraulic fluid out of the other of the first portion and the second portion of each of the recesses.

6. The method according to claim 4 wherein the hydraulic fluid is engine lubricating oil from a main oil gallery of the engine.

7. An internal combustion engine comprising:

a crankshaft, said crankshaft being rotatable about an axis;

a camshaft, said camshaft being rotatable about a second axis, said second axis being parallel to said axis, said camshaft being subject to torque reversals during the rotation thereof;

oppositely acting first and second hydraulic means for varying the position of the camshaft relative to the crankshaft, each of said first and second hydraulic means having a first member attached to said camshaft, being rotatable with said camshaft and being non-oscillatable with respect to said camshaft, each of said first and second hydraulic means further having a second member, each of the second members being rotatable with said camshaft and being oscillatable with respect to said camshaft;

timing belt means for transmitting rotary movement from the crankshaft to the second members of the first and second hydraulic means; and means reactive to torque reversals in the camshaft for varying the positions of the second members of the first and second hydraulic means relative to the camshaft.

8. An internal combustion engine according to claim 7 wherein the first members of said first and second hydraulic means comprise first and second circumferentially spaced apart lobes of a vane, said vane being attached to said camshaft, and wherein the second members of said first and second hydraulic means comprise first and second circumferentially spaced apart recesses of a housing in the form of a pulley adapted to be driven by said timing belt means, each of the first and second recesses of said housing receiving one of the first and second lobes and permitting oscillating movement of said one of said first and second lobes therein.

9. An engine according to claim 8 wherein said means reactive to torque reversals comprises control means for permitting the housing to move in a first direction relative to the camshaft in reaction to a torque pulse in the camshaft in a first direction and for preventing the housing from moving in a second direction relative to the camshaft in reaction to a torque pulse in the camshaft in a second direction.

10. An engine according to claim 9 wherein each of said first and second lobes respectively divides each of said first and second recesses into a first portion and a second portion, wherein said control means comprises means for transferring hydraulic fluid into one of said first portion and said second portion of each of said first and second recesses, each of said one of said first portion and said second portion of said each of said first and second recesses being capable of sustaining hydraulic pressure and further comprising annular seal means for sealing the timing belt means and the portion of the housing which is contacted by the timing belt means from contact with the hydraulic fluid.

11. An engine according to claim 10 wherein said control means comprises means for simultaneously transferring hydraulic fluid out of the other of said first portion and second portion of said each of said first and second recesses.

12. An engine according to claim 11 wherein each of said first portion and said second portion of each of said first and second recesses is capable of sustaining hydraulic pressure, and wherein said control means is capable of being reversed to transfer hydraulic fluid out of said one of said first portion and said second portion of said each of said first and second recesses and to transfer hydraulic fluid into said other of said first portion and said second portion of said each of said first and second recesses, said engine further comprising:

an engine control unit response to at least one engine operating condition for selectively reversing the operation of said control means.

13. An engine according to claim 12 wherein said hydraulic fluid comprises engine lubricating oil, and further comprising:

conduit means for transferring engine lubricating oil from a portion of said engine to said control means.

14. An engine according to claim 13 wherein said control means includes a spool valve, said spool valve having a body and a spool member which is adapted to move longitudinally within said body, said spool member having an outermost end, force means for selectively imposing a force on said spool member to move said spool member away from said force means, and seal means for preventing the engine lubricating oil from contacting said force means.

15. An engine according to claim 14 wherein said force means comprises a rotary, electrically operated motor and rotary to linear motion translation means aligned with said spool for converting rotary motion of said motor into linear motion.

16. An engine according to claim 15 wherein said motor is a stepper motor.

17. An engine according to claim 15 wherein said rotary to linear motion translation means comprises a lead screw.

18. An engine according to claim 15 wherein said rotary to linear motion translation means comprises an axial face cam.

19. An engine according to claim 15 wherein said motor has a drive shaft with an axis of rotation which extends generally perpendicularly of said spool, and wherein said rotary to linear motion translation means is a rotary cam which is carried on said drive shaft and which is rotatable therewith.

* * * * *